(12) United States Patent
Nield et al.

(10) Patent No.: US 10,503,547 B2
(45) Date of Patent: *Dec. 10, 2019

(54) TASK SCHEDULING IN A GPU

(71) Applicant: Imagination Technologies Limited, Kings Langley (GB)

(72) Inventors: Simon Nield, Wendover (GB); Adam de Grasse, Hertfordshire (GB); Luca Iuliano, Buckinghamshire (GB); Ollie Mower, Hertfordshire (GB); Yoong-Chert Foo, London (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/412,197

(22) Filed: May 14, 2019

(65) Prior Publication Data

US 2019/0266018 A1   Aug. 29, 2019

Related U.S. Application Data

(63) Continuation of application No. 15/713,803, filed on Sep. 25, 2017, now Pat. No. 10,318,348.

(60) Provisional application No. 62/398,747, filed on Sep. 23, 2016.

(51) Int. Cl.
*G06F 9/48* (2006.01)
*G06F 1/329* (2019.01)
*G06F 9/50* (2006.01)
*G06T 1/20* (2006.01)

(52) U.S. Cl.
CPC ............ *G06F 9/4881* (2013.01); *G06F 1/329* (2013.01); *G06F 9/5027* (2013.01); *G06F 2209/483* (2013.01); *G06F 2209/486* (2013.01); *G06T 1/20* (2013.01); *Y02D 10/24* (2018.01)

(58) Field of Classification Search
CPC ...... G06F 9/4881; G06F 1/329; G06F 9/5027; G06F 2209/483; G06F 2209/486; G06T 1/20; Y02D 10/24
See application file for complete search history.

(56) References Cited

U.S. PATENT DOCUMENTS

| 4,980,824 A | 12/1990 | Tulpule et al. |
| 9,104,500 B1* | 8/2015 | Krikellas ................. G06F 9/52 |
| 9,286,106 B1 | 3/2016 | Huang |
| 2003/0120709 A1 | 6/2003 | Pulsipher et al. |
| 2004/0073906 A1* | 4/2004 | Chamdani ........... G06F 9/30134 |
| | | 718/102 |
| 2005/0198644 A1* | 9/2005 | Jiang ....................... G06F 9/52 |
| | | 718/107 |
| 2009/0158293 A1 | 6/2009 | Kajihara |
| 2011/0276966 A1 | 11/2011 | Christensen et al. |

(Continued)

*Primary Examiner* — Benjamin C Wu
(74) *Attorney, Agent, or Firm* — Vorys, Sater, Seymour and Pease LLP; Vincent M DeLuca

(57) ABSTRACT

A method of scheduling tasks within a GPU or other highly parallel processing unit is described which is both age-aware and wakeup event driven. Tasks which are received are added to an age-based task queue. Wakeup event bits for task types, or combinations of task types and data groups, are set in response to completion of a task dependency and these wakeup event bits are used to select an oldest task from the queue that satisfies predefined criteria.

20 Claims, 6 Drawing Sheets

(56) References Cited

U.S. PATENT DOCUMENTS

2012/0324449 A1* 12/2012 Huetter ................ G06F 9/5066
              718/1
2013/0324449 A1   12/2013 Hommeltoft et al.
2013/0326537 A1   12/2013 Edelstein et al.
2014/0237474 A1    8/2014 Branton
2017/0364136 A1* 12/2017 Nandha Premnath .. G06F 1/329

* cited by examiner

TASK SCHEDULING IN A GPU

CROSS-REFERENCE TO RELATED APPLICATIONS AND CLAIM OF PRIORITY

This application is a continuation under 35 U.S.C. 120 of copending application Ser. No. 15/713,803 filed Sep. 25, 2017, which claims priority under 35 U.S.C. 119(e) from Provisional Application Ser. No. 62/398,747 filed Sep. 23, 2016.

BACKGROUND

A graphics processing unit (GPU) comprises a highly parallel structure which is designed to efficiently process large amounts of data in parallel. GPUs are typically used for computer graphics (e.g. to render 3D images on a screen), however they may also be used for other operations which benefit from the parallelism they provide.

The embodiments described below are provided by way of example only and are not limiting of implementations which solve any or all of the disadvantages of known GPUs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of scheduling tasks within a GPU or other highly parallel processing unit is described which is both age-aware and wakeup event driven. Tasks which are received are added to an age-based task queue. Wakeup event bits for task types, or combinations of task types and data groups, are set in response to completion of a task dependency and these wakeup event bits are used to select an oldest task from the queue that satisfies predefined criteria.

A first aspect provides method of scheduling tasks within a processor, each task having a task type identifier, comprising: in response to receiving, at a task scheduling engine, an indication that a dependency for a task in a task queue has completed, updating state data for the task that relates to the completed dependency and setting wakeup event state data for a task type corresponding to the task type identifier of the task; identifying one or more candidate task types based on the wakeup event state data; selecting one of the candidate task types; identifying an oldest non-executing task of the selected task type in the task queue; and in response to determining that the identified task of the selected task type has all its dependencies met, selecting the task for execution.

A second aspect provides a scheduler for a processor comprising: a task scheduling engine; a task queue; and a data store arranged to store wakeup state data, and wherein the task scheduling engine comprises: a first hardware logic block arranged, in response to receiving an indication that a dependency for a task in the task queue has completed, to clear state data for the task that relates to the completed dependency and to update wakeup event state data for a task type corresponding to the task type identifier of the task; a second hardware logic block arranged to identify one or more candidate task types based on the wakeup event state data, to select one of the candidate task types, to identify an oldest non-executing task of the selected task type in the task queue and in response to determining that the identified task of the selected task type has all its dependencies met, to select the task for execution.

A third aspect provides an integrated circuit manufacturing system comprising: a non-transitory computer readable storage medium having stored thereon a computer readable description of an integrated circuit that describes a scheduler; a layout processing system configured to process the integrated circuit description so as to generate a circuit layout description of an integrated circuit embodying the scheduler; and an integrated circuit generation system configured to manufacture the scheduler according to the circuit layout description, wherein the scheduler comprises: a task scheduling engine; a task queue; and a data store arranged to store wakeup state data, and wherein the task scheduling engine comprises: a first hardware logic block arranged, in response to receiving an indication that a dependency for a task in the task queue has completed, to clear state data for the task that relates to the completed dependency and to update wakeup event state data for a task type corresponding to the task type identifier of the task; a second hardware logic block arranged to identify one or more candidate task types based on the wakeup event state data, to select one of the candidate task types, to identify an oldest non-executing task of the selected task type in the task queue and in response to determining that the identified task of the selected task type has all its dependencies met, to select the task for execution.

Further aspects provide:
  a scheduler configured to perform the method as described herein, wherein the scheduler may be embodied in hardware on an integrated circuit;
  a processor comprising the scheduler as described herein.
  computer readable code configured to perform the steps of the method as described herein when the code is run on a computer, wherein the code may be encoded on a computer readable storage medium.
  a method of manufacturing, at an integrated circuit manufacturing system, a scheduler as described herein.
  an integrated circuit definition dataset that, when processed in an integrated circuit manufacturing system, configures the integrated circuit manufacturing system to manufacture a scheduler as described herein.
  a computer readable storage medium having stored thereon a computer readable description of an integrated circuit that, when processed in an integrated circuit manufacturing system, causes the integrated circuit manufacturing system to manufacture a scheduler as described herein.

The scheduler described herein may be embodied in hardware on an integrated circuit. There may be provided a method of manufacturing, at an integrated circuit manufacturing system, a scheduler. There may be provided an integrated circuit definition dataset that, when processed in an integrated circuit manufacturing system, configures the system to manufacture a scheduler. There may be provided a non-transitory computer readable storage medium having stored thereon a computer readable description of an integrated circuit that, when processed, causes a layout processing system to generate a circuit layout description used in an integrated circuit manufacturing system to manufacture a scheduler.

There may be provided an integrated circuit manufacturing system comprising: a non-transitory computer readable storage medium having stored thereon a computer readable integrated circuit description that describes the scheduler; a layout processing system configured to process the integrated circuit description so as to generate a circuit layout description of an integrated circuit embodying the scheduler; and an integrated circuit generation system configured to manufacture the scheduler according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
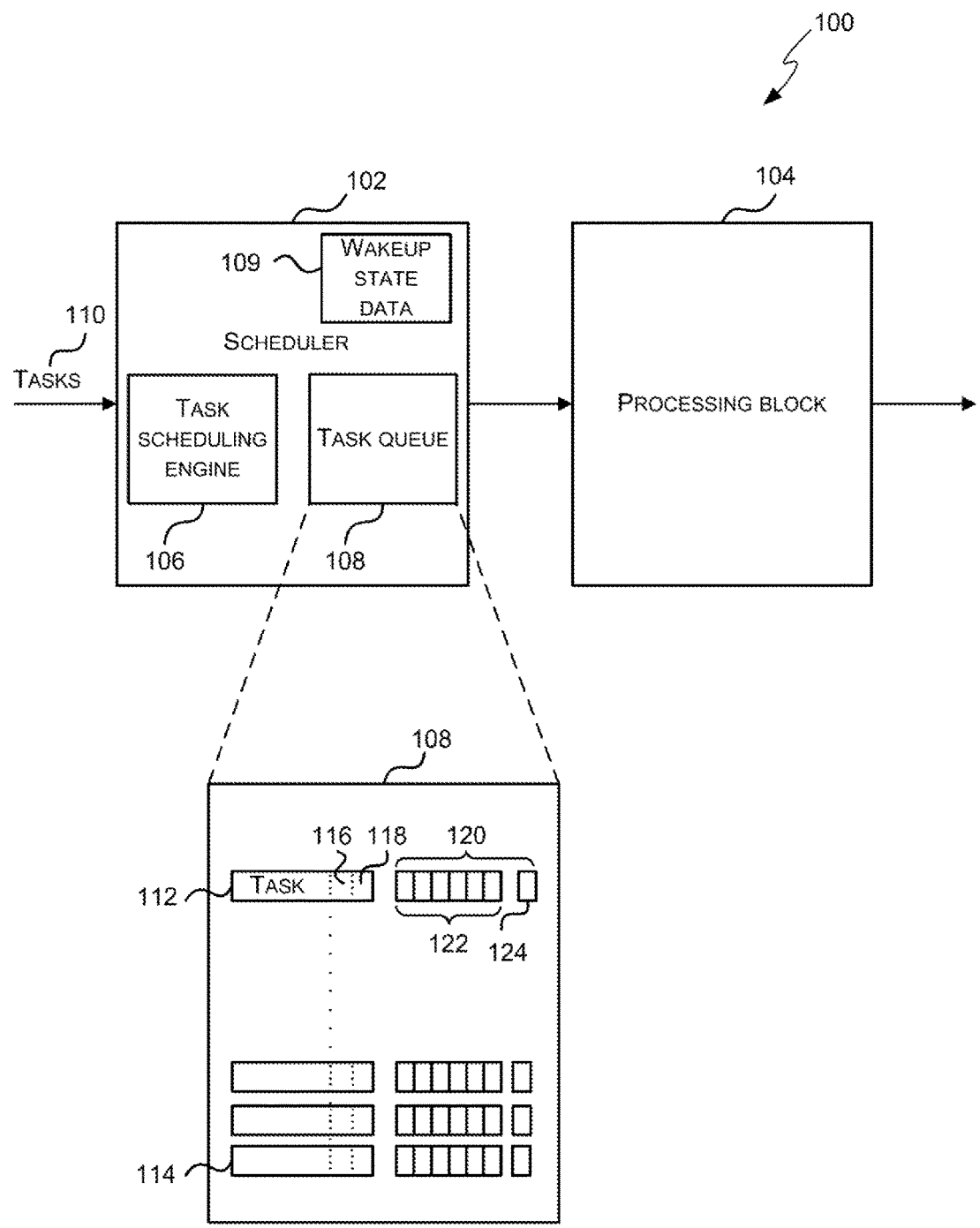
FIG. 1 is a schematic diagram showing a processor comprising a scheduler.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Described herein is a method of scheduling tasks within a GPU or other highly parallel processing unit (such as for high performance computing applications or any other application where there are lots of tasks). The term 'task' is used herein to refer to a group of work in which the same program (e.g. the same sequence of ALU instructions) is applied to a set of data, where this data may comprise one or more elements (e.g. a plurality of pixels or vertices). A task may therefore be described as defining a program to be run on a set of data. The method is implemented within a scheduler in the GPU or other highly parallel processing unit.

Instead of using a simple round-robin scheduling approach, the scheduling method uses wake-up events that are triggered in response to completion of a task dependency to update a candidate set of tasks from which a task can be selected for execution. Once selected for execution, a task is progressed further along the execution pipeline and there may be further scheduling involved to determine which instructions from which tasks (which have already been selected for execution) are executed on an ALU (or ALU pipeline) within the GPU or other highly parallel processing unit. This scheduling approach improves the efficiency of the GPU overall, e.g. by avoiding searches for tasks that are not able to run.

FIG. 1 is a schematic diagram showing a processor 100 which may be a GPU or other highly parallel processing unit. It will be appreciated that FIG. 1 only shows some elements of the processor and there may be many other elements (e.g. caches, interfaces, etc.) within the processor that are not shown in FIG. 1. The processor 100 comprises a scheduler 102 and a processing block 104.

The processing block 104 comprises hardware logic for executing the instructions within tasks that are scheduled for execution by the scheduler 102. The processing block 104 therefore comprises many arithmetic logic units (ALUs) and the ALUs may be grouped in any way. The processing block 104 may comprise different types of ALUs, e.g. with each type of ALU being optimized for a particular type of computation. In examples where the processor 100 is a GPU, the processing block 104 may comprise a plurality of shader cores, with each shader core comprising one or more ALUs. In various examples, the processing block 104 may be a single-instruction multi-data (SIMD) processor (which in various examples may be referred to as a Unified Shading Cluster (USC)) or a single-instruction single-data (SISD) processor.

The scheduler 102 comprises a task scheduling engine 106, a task queue 108 and a data store (e.g. memory or registers) arranged to store a set of wakeup event state bits 109. As shown in FIG. 1, the scheduler 102 receives tasks 110 and these tasks 110 are added to the task queue 108 by the task scheduling engine 106 and then selectively scheduled for execution by the processing unit 104 as described in detail below. The tasks 110 may be of different types (e.g. they may relate to different types of computation and/or different types of data). As described above, a task is a group of work in which the same program (e.g. sequence of ALU instructions) is applied to a set of data, where this data may comprise one or more elements (e.g. a plurality of pixels or vertices). Where the processor 100 is a GPU, the program to which a task relates may be a shader program.

Each task 110 that is received by the scheduler 102 (and hence by the task scheduling engine 106) has an identifier which identifies the type of the task and this identifier may be referred to as the task type ID. Tasks of different types may be generated by different entities (which may be part of the processor 100 but are not shown in FIG. 1) and in various examples these entities which generate tasks may be referred to as Data Masters. In such examples the identifier which identifies the type of the task (the task type ID) may, in various examples, be referred to as the Data Master ID and identify both the type of the task and the source of the task (with different sources generating different types of task).

A task 110 that is received by the scheduler 102 (and hence by the task scheduling engine 106) may have another identifier in addition to the task type ID. The second identifier, where provided, identifies the data group to which the task applies and may be referred to as the data group ID. In various examples, all tasks 110 received by the scheduler 102 (and hence by the task scheduling engine 106) may have both a task type ID and a data group ID. The data to which the tasks relate may be part of a large collection of data, e.g. a computer graphics image, and to reduce the complexity of the processing, this large collection of data may be subdivided into data groups (where these may for example be referred to as tiles in a GPU which uses tiled rendering). The data group ID (which may, in various examples, be referred to as the tile ID) does not refer to the actual pieces of data (e.g. pixels, vertices, etc.) to which the task applies, but instead to the data group that comprises the actual pieces of data (which may alternatively be referred to as data items) to which the task applies. For example, a task that processes pixels 0-31 which are part of tile A of a computer graphics image will have a data group ID which corresponds to tile A. Similarly, a task that processes vertices 0-15 which are part of tile B of a computer graphics image will have a data group ID that corresponds to tile B. A task 110 may explicitly specify the data to which it relates (for example, a task may comprise X and Y coordinates for a 2×2 block of pixels to which the task relates).

The task scheduling engine 106 within the scheduler 102 adds tasks 110 that are received to the task queue 108 and then selectively schedules tasks from the queue 108 for execution by the processing unit 104. The task scheduling engine 106 may be implemented in hardware. Alternatively, it may be microcoded and executed within the processor 100. The task queue 108 is an age-based queue such that new tasks are added to one end (e.g. the back of the queue) and tasks 110 remain in the task queue 108 until execution is complete. As a task 110 may relate to many pieces of data (e.g. multiple pixels or vertices, which may be specified within the task) and the program may not be executed at exactly the same time on all pieces of data, the program may finish executing for some pieces of data ahead of other pieces of data and therefore the task 110 remains in the task queue 108 until the program (e.g. a sequence of ALU instructions) has finished executing for all pieces of data to which the task relates. Tasks 110 in the task queue 108 may complete out of order (i.e. in a different order to the order in which they were received by the scheduler 102 and placed in the task queue 108) and if there are tasks in the task queue 108 behind a completing task, their position in the task queue 108 is shifted when the completing task completes and is removed from the task queue 108.

FIG. 1 also shows a schematic diagram of the task queue 108 comprising a plurality of tasks arranged in age order, with the first task 112 in the queue 108 (at the top of the queue) being the newest task and the last task 114 in the queue 108 (at the bottom of the queue) being the oldest task. As described above, each task that is received by the task scheduling engine 106 and stored in the task queue 108 comprises a task type ID 116 and may also comprise a data group ID 118. As also shown in FIG. 1, there is data 120 associated with each task 110 in the queue 108 (e.g. in the form of a number of state bits) and this data 120 is set initially by the task scheduling engine 106 when the task is added to the queue and used in selecting tasks for execution, as described in detail below. The data 120 associated with a task may subsequently be updated by the task scheduling engine 106 or by another entity.

The data 120 associated with each task 110 in the queue 108 may take any form and in various examples it may comprise a plurality of state bits, as shown in FIG. 1. These state bits comprise one or more state bits 122 that track task specific dependencies (where a task specific dependency might, for example, be to wait for a specific cache line write to have occurred) and these state bits 122 are updated by the task scheduling engine 106 when one of the dependencies complete (e.g. once the write to the specific cache line has occurred). In other examples, a counter may be used instead of the plurality of state bits, e.g. where the counter maintains a count of the number of things which need to complete before the task can be scheduled. Decrements to that count may be performed by the task scheduling engine 106 or by another entity and the task 110 is allowed to proceed when the counter reaches zero. Alternatively, a counter which increments may be used, with a task being allowed to proceed when the counter reaches a pre-defined non-zero value.

The data 120 associated with a task additionally indicates whether the task is already scheduled for execution (and hence may be executing) on the processing block 104 (e.g. using bit 124). When a task 110 is added to the task queue 108 by the task scheduling engine 106, the data is updated (e.g. bit 124 is set) by the task scheduling engine 106 to indicate that the task is not yet scheduled for execution (or executing) and then when the task is subsequently selected for execution, the data (e.g. bit 124) is updated. As described in more detail below, the data 120 is used to select a task for execution.

The scheduler 102 further comprises wakeup event state data, e.g. a plurality of wakeup event state bits 109 as shown in FIG. 1. Each of the wakeup event state bits 109 may correspond to a different task type ID or alternatively, each of the wakeup event state bits 109 may correspond to a different combination of task type ID and data group ID (e.g. such that there may be several wakeup event state bits that correspond to the same task type ID but which correspond to different data group IDs and vice versa). Initially all of these wakeup event state bits are set (e.g. to zero) by the task scheduling engine 106 to indicate no wakeup events. When one of the task specific dependencies associated with the task completes, a corresponding wakeup event state bit 109 is then updated (e.g. from zero to one) to indicate a wakeup event for the particular task type ID (and optionally data group ID) associated with the task. In other examples, the wakeup event state data may have other forms, but provide the same functionality (i.e. to indicate a wakeup event for a particular task type ID and optionally data group ID). As described in more detail below, the wakeup event state data (e.g. bits 109) is used to determine which type of task is selected for execution and also to identify a task of the selected type for execution.

Although FIG. 1 shows the wakeup state data 109 and task queue 108 as separate blocks of storage, the storage for the wakeup state data 109 and the task queue data 108 may be implemented anywhere in the system (e.g. external to the scheduler 102 but accessible by the scheduler 102) and in various examples the wakeup state data 109 and the task queue 108 may be co-located.

Figure 2:
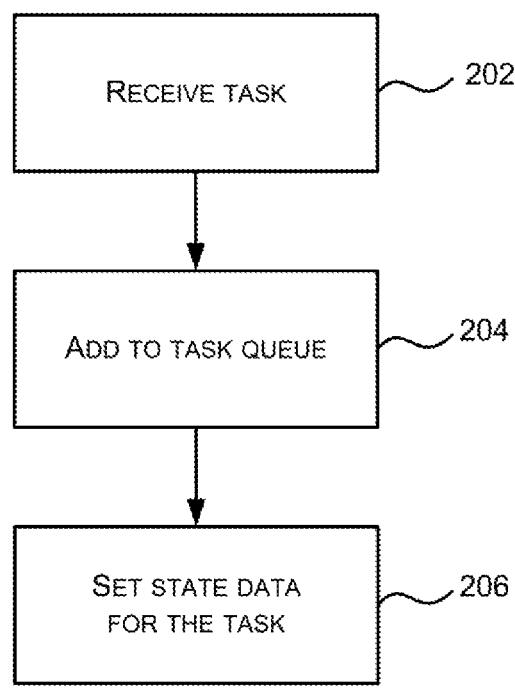
FIG. 2 is a flow diagram showing an example method of operation of a task scheduling engine when it receives a new task.

FIG. 2 is a flow diagram showing an example method of operation of the task scheduling engine 106 when it receives a new task 110. In response to receiving a task 110 (block 202), the task scheduling engine 106 adds the task to the task queue 108 (block 204). As described above, the task queue 108 is an age-based queue and the task 110 is added to one end of the queue 108 (in block 204), e.g. to the top of the task queue 108 shown in FIG. 1. The state data 120 for the newly added task are set by the task scheduling engine 106 (block 206) to indicate that the task is not currently executing in the processor block (e.g. bit 124) and to identify any task specific dependencies (e.g. bits 122).

Figure 3:
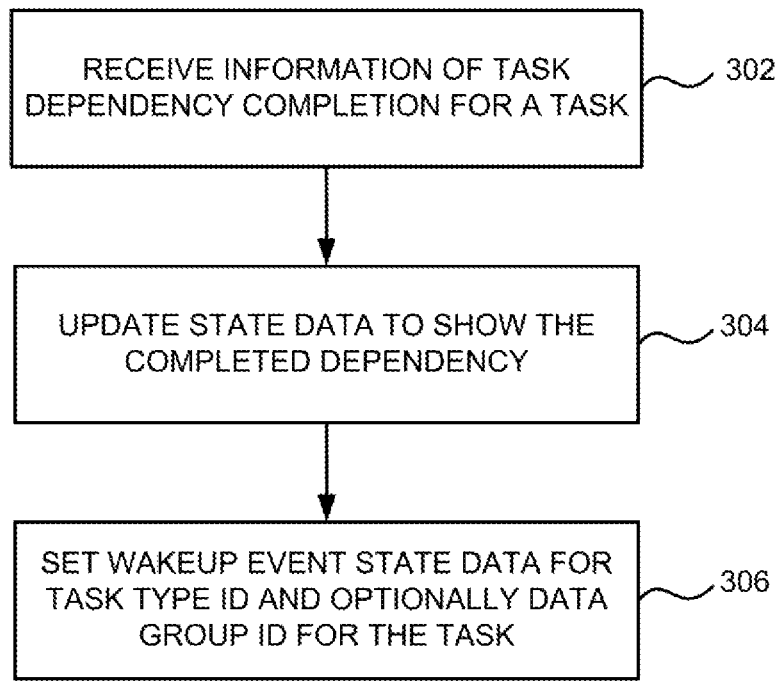
FIG. 3 is a flow diagram showing an example method of operation of a task scheduling engine when a dependency for one of the tasks in the task queue completes.

FIG. 3 is a flow diagram showing an example method of operation of the task scheduling engine 106 when a dependency for one of the tasks in the task queue 108 completes. In response to receiving an indication of a task dependency completion (block 302), the task scheduling engine 106 updates the state data 120 (block 304). For example the state data may be updated (in block 304) by clearing the corresponding state bit(s), e.g. one or more bits 122, for the task(s) that relate to the completed dependency or updating a counter value. As well as updating the state data (e.g. by clearing the corresponding state bit(s) or updating a counter value), the task scheduling engine 106 also updates the wakeup event state data to indicate a wakeup event for the particular task type ID (and optionally data group ID) associated with the task that relates to the completed dependency (block 306). For example, the task scheduling engine 106 may set a wakeup event state bit (in block 306) to indicate a wakeup event for the particular task type ID (and optionally data group ID) associated with the task that relates to the completed dependency and the bit may be set on a per-task type (e.g. where a data group ID is not specified for the task) or per task type and data group (e.g. where a task specifies both a task type ID and a data group ID).

Figure 4:
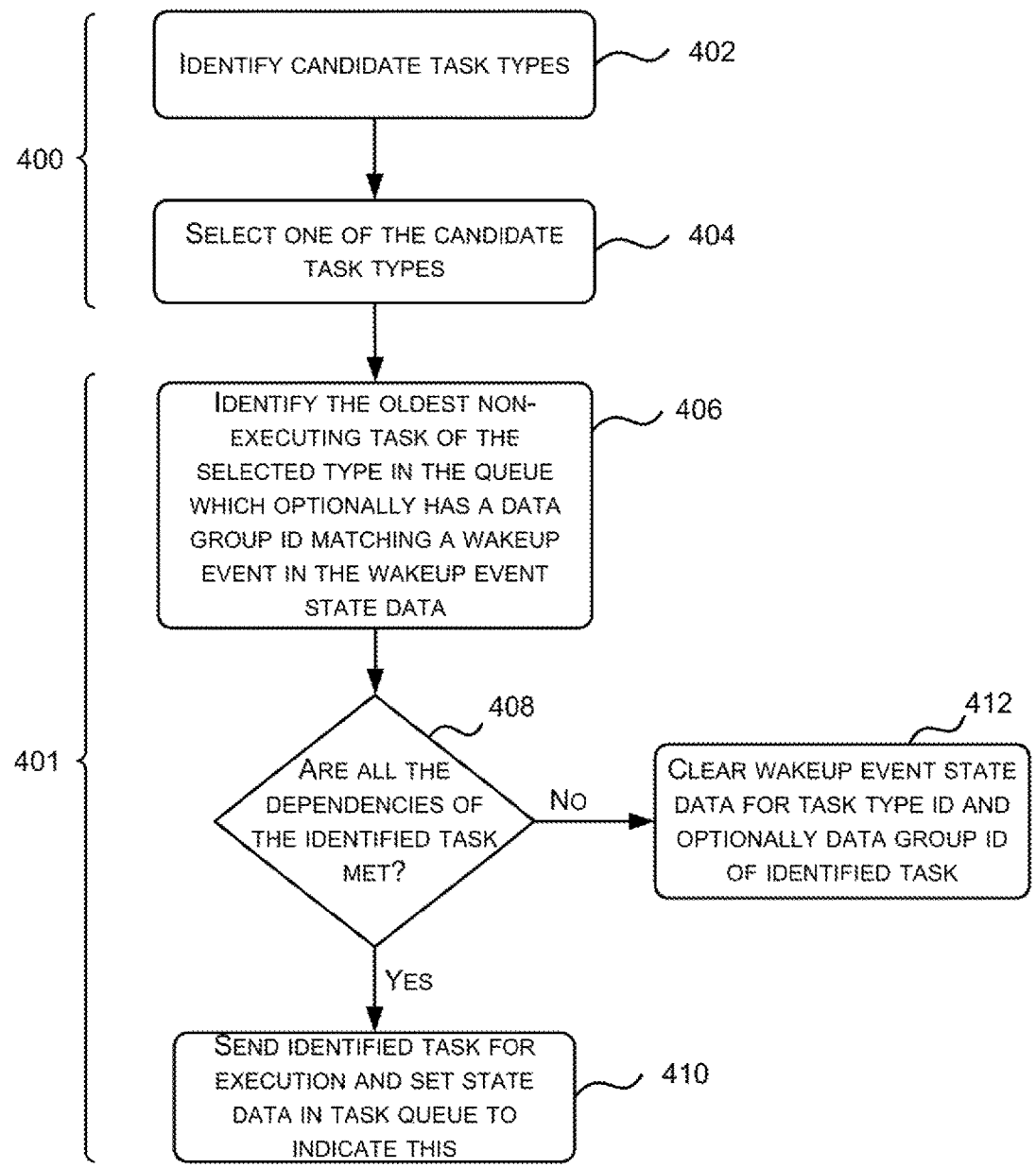
FIG. 4 is a flow diagram showing an example method of operation of a task scheduling engine to select a task for execution.

FIG. 4 is a flow diagram showing an example method of operation of the task scheduling engine 106 to select a task for execution. Tasks are selected from those stored in the task queue 106 and the selection is made based on the wakeup event state data 109 and the state data 120 for each task. This state data 109, 120 is set and updated by the task scheduling engine 106 (and optionally other entities) as described above. As shown in FIG. 4, the method operates in two parts 400, 401. In the first part 400 (blocks 402-404), the task scheduling engine 106 selects a task type and in the second part 401 (blocks 406-412), the task scheduling engine 106 selects a task of the selected type.

The task scheduling engine 106 selects a task type by first identifying candidate task types (block 402) based on the wakeup event state data 109 and the contents of the task queue 108. Only those task types with a task in the task queue 108 (as added in block 204 of FIG. 2) and associated wakeup event state data 109 (e.g. an associated wakeup event state bit) set to indicate a wakeup event (as set in block 306 of FIG. 3) are candidate (or valid) task types. Having identified the candidate task types (in block 402), one of these candidate task types is selected (block 404). In various examples, a round-robin approach may be used to select a task type from the set of candidate task types.

In examples where tasks 110 do not comprise a data group ID, having selected a task type (in block 404), the task scheduling engine 106 searches the task queue 108 to identify the oldest task in the queue 108 that is of the selected type and is not currently executing, e.g. as indicated by bits 124 (block 406). In such examples the selection (in block 406) is based on three criteria: the task type, the age of the task and whether it is executing or not.

In examples where tasks 110 also comprise a data group ID, the data group ID is not involved in the selection of a task type (in block 404) but the combination of task type and data group ID is considered when identifying a task of the selected task type (in block 406). In such examples the selection (in block 406) is based on the task type, the age of the task, whether it is executing or not and on a comparison of the combination of the task type ID and data group ID to the wakeup event state data 109. The task that is identified (in block 406) is the oldest task of the selected type (as identified in block 404) that is not currently executing and that also has a task type ID and data group ID that matches one of the wakeup events (e.g. one of the wakeup event bits) stored in the wakeup event state data 109. In such an example, a task in the task queue that is of the selected task type (from block 404, e.g. task type A) and that relates to a particular data group (e.g. data group 1) cannot be identified (in block 406) if there is not a wakeup event in the wakeup event state data 109 which has been set to indicate a wakeup event for the specific combination of the selected task type (from block 404) and the particular data group (e.g. a wakeup event bit which has been set for the combination of task type A and data group 1). The search which is performed to identify a task (in block 406) may be performed from the oldest task in the queue 108 to the newest task or in any other order.

Having identified a task of the selected task type and optionally having a task type and data group ID that matches a wakeup event in the wakeup event state data (in block 406), a check is performed on the dependencies of the identified task (block 408). If all the task dependencies of the identified task are met ('Yes' in block 408), as indicated by the state data 122 (which may, for example, track task specific dependencies) for the identified task, then the identified task is sent for execution and the state data (e.g. bit 124) associated with the identified task is set to indicate that it has been sent for execution (block 410). If however, it is determined that not all the task dependencies of the identified task are met ('No' in block 408), the identified task is not yet ready for execution. The wakeup event state data 109 (e.g. the wakeup event state bit) associated with the task type (and optionally data group) of the identified task is cleared (block 412) and the method may be repeated.

By clearing the wakeup event state (e.g. bit) in the wakeup event state data 109 (in block 412), this prevents a task with the particular combination of task type ID and data group ID from being identified again (in block 406) until another one of the dependencies has been met and the wakeup event state (e.g. bit) which was cleared (in block 412) is reset (in block 306 of FIG. 3), e.g. the same task, which failed the test in block 408, will not be identified again (in block 406) until a further dependency has been met for the particular combination of task type ID and data group ID.

For example, if a task type A is selected (in block 404) and there are wakeup events (as identified in the wakeup event state data 109) for the following combinations: task type A & data group 1, task type A & data group 2, task type A and data group 3, then the oldest non-executing task in the queue which has task type A and relates to data group 1, 2 or 3 is identified (in block 406). If the task that is identified (in block 406) relates to data group 1 and it is discovered that all the dependencies for the identified task are not met ('No' in block 408), then the wakeup event state data 109 relating to the combination of task type A and data group 1 is cleared (in block 412). This means that in a subsequent iteration of block 406, then a non-executing task of task type A which relates to data group 1 cannot be identified unless a further wakeup event for that combination of task type and data group is generated (e.g. using the method of FIG. 3).

The method shown in FIG. 4 may be implemented over two clock cycles. In examples, where the method is implemented over two clock cycles, in a first clock cycle (cycle n), candidate task types are identified, one is selected, the oldest non-executing task of the selected type (which optionally also meets other criteria) is identified and it is determined whether all its dependencies are met (blocks 402-408). If all the dependencies are met ('Yes' in block 408), then the sending of the identified task and setting of state data (in block 410) is implemented on the next clock cycle (cycle n+1) and the earlier method steps (blocks 402-408) are not implemented again until the following clock cycle (cycle n+2). However, if all the dependencies are not met ('No' in block 408), then the wakeup event state data is cleared (in block 412) as part of the first clock cycle (cycle n) and the method (blocks 402-408) are repeated in the next clock cycle (cycle n+1).

Alternatively the method shown in FIG. 4 may be implemented every clock cycle, such that candidate task types are identified, one is selected, the oldest non-executing task of the selected type (which optionally also meets other criteria) is identified and it is determined whether all its dependencies are met (blocks 402-408) each clock cycle irrespective of the outcome of the dependency determination (in block 408).

Figure 5A:
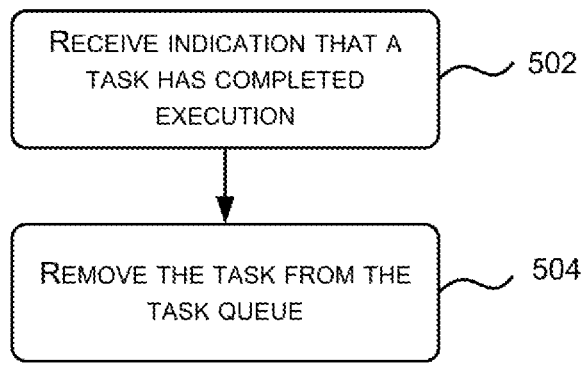
FIG. 5A is a flow diagram showing a first example method of operation of a task scheduling engine to remove tasks from a task queue.

FIG. 5A is a flow diagram showing an example method of operation of the task scheduling engine 106 to remove tasks from the task queue 108. As described above, tasks are not removed from the task queue 108 until they have completely finished executing, i.e. the program associated with the task has executed on all the data associated with the task. In response to receiving an indication that a task has fully executed (block 502), the task scheduling engine 106 removes the particular task from the task queue (block 504). As noted above, tasks may complete out of order and tasks following a task that is removed from the task queue 108 may move up to fill the vacated position in the queue.

Figure 5B:
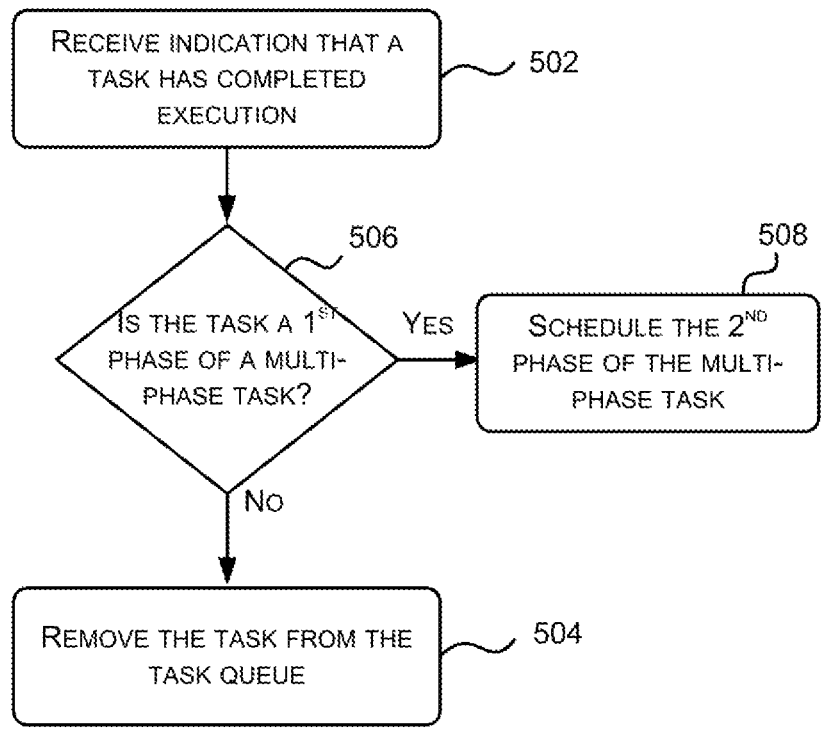
FIG. 5B is a flow diagram showing a second example method of operation of a task scheduling engine to remove tasks from a task queue.

In various examples one or more of the tasks 110 received by the scheduler 102 is a multi-phase task. A multi-phase task comprises a first phase task and a second phase task. In the case of a multi-phase task, when the first phase task completes, the entire multi-phase task is not removed from the queue but instead the second phase task (from the multi-phase task) is scheduled (and hence becomes a new input to the method of FIG. 202). In such examples, the method shown in FIG. 5A may be modified as shown in FIG. 5B. As shown in FIG. 5B, if the task that completes is not the first phase of a multi-phase task ('No' in block 506), then the task is removed from the task queue (block 504) as described above. However, if the task that completes is the first phase of a multi-phase task ('Yes' in block 506), then the second phase of that particular multi-phase task is scheduled (block 508) and therefore becomes a new task which is received and stored according to the method shown in FIG. 3 and described above.

In examples where one or more of the tasks 110 received by a scheduler is a multi-phase task, the method shown in FIG. 4 may also be modified to prioritize execution of second phase tasks over other tasks (i.e. non-multi-phase tasks and first phase tasks of multi-phase tasks). In such examples, the identification of a task (in block 406) may be modified such that the oldest non-executing second phase task of the selected type in the queue (which optionally has a data group ID matching a wakeup event in the wakeup event state data) is identified in preference to any other task. In the absence of any non-executing second phase task in the queue that meets the criteria to be identified (i.e. it is of the selected type and optionally has a data group ID matching a wakeup event in the wakeup event state data), then the oldest non-executing other task (i.e. a non-multi-phase task or a first phase task of a multi-phase task) that meets the criteria (i.e. it is of the selected type and optionally has a data group ID matching a wakeup event in the wakeup event state data) is identified (in block 406).

The task scheduling engine 106 may be implemented in hardware and/or software as described above. In various examples, the task scheduling engine 106 may comprise a plurality of hardware logic blocks, e.g. a hardware logic block that implements the method of FIG. 2, a hardware logic block that implements the method of FIG. 3, a hardware logic block that implements the method of FIG. 4 and a hardware logic block that implements the method of FIG. 5A or 5B. These hardware logic blocks, whilst functionally separate, may be implemented in an integrated manner, e.g. such that hardware within the task scheduling engine 106 may be considered to be part of more than one functional hardware logic block as it implements aspects of more than one of the methods described above and shown in FIGS. 2-5B.

Using the methods described above, task scheduling occurs once per task. Once a task has been selected and sent for execution (in block 410 of FIG. 4), the state data 120 in the task queue 108 is updated (e.g. a bit 124 is set in the state data 120) and this prevents the task from being selected in a subsequent iteration of the method (i.e. it cannot be selected in block 406).

In various examples, further scheduling may be implemented following the selection of a task (in block 410 of FIG. 4), for example to determine which instructions from which executing tasks are sent to the different ALUs within the processing block 104. This further scheduling may be implemented in any way.

Although FIG. 1 shows a single task queue 108, in various variations of the methods described above, the scheduler 102 may comprise multiple task queues where the different task queues may be used to store tasks dependent upon their state (e.g. two tasks queues—a first task queue comprising tasks which have not yet been selected for execution and a second task queue comprising tasks which have been selected for execution) and/or dependent upon their task type ID (e.g. a separate, age-based queue for tasks with different task type IDs).

In examples where there are two task queues, one comprising tasks which have not yet been selected for execution and the other comprising tasks which have been selected for execution, the state data (e.g. bits 124) which indicates whether a task has been selected for execution are omitted and instead of updating this data (in block 410 of FIG. 4), the identified task is moved from the first task queue to the second task queue. Additionally, in such examples, the method shown in FIG. 2 may be used to add tasks to the first task queue and the method shown in FIG. 5A or 5B may be used to remove tasks from the second task queue. In such examples, the first task queue is an age-based queue and the second task queue is optionally an age-based queue.

In examples where there are different task queues for different task type IDs, the candidate task types may be identified (in block 402) by analyzing all of the task queues and then arbitrating (in block 404) between the different queues (e.g. using a round-robin or other scheme).

Although the scheduling method shown in FIG. 4 is described above in combination with the methods of adding and removing tasks from the task queue 108 (as shown in FIGS. 2, 5A and 5B) and the method of triggering a wakeup event (as shown in FIG. 3) in various examples the scheduling method shown in FIG. 4 may be used in combination with a different method of triggering a wakeup event and/or different methods of adding and removing tasks from the task queue 108.

Similarly, although the method of triggering a wakeup event shown in FIG. 3 is described above in combination with the methods of adding and removing tasks from the task queue 108 (as shown in FIGS. 2, 5A and 5B) and the scheduling method (as shown in FIG. 4) in various examples the method of triggering a wakeup event shown in FIG. 3 may be used in combination with a different scheduling method and/or different methods of adding and removing tasks from the task queue 108.

Using the methods described above, the scheduling of tasks (and in particular the search operation as shown in FIG. 4 and described above) is driven by wakeup events and this improves performance by eliminating needless searches into the queue for tasks that are not ready to run. As well as improving performance, the reduction in needless searches (i.e. searches that ultimately do not result in a task being sent for execution) reduces the power consumed (e.g. because the search hardware logic is not active and hence is not consuming any switching power).

The processor 100 in FIG. 1 is shown as comprising a number of functional blocks. This is schematic only and is not intended to define a strict division between different logic elements of such entities. Each functional block may be provided in any suitable manner. It is to be understood that any intermediate values described herein as being formed by a method block (in any of FIGS. 2-5B) need not be physically generated by the scheduler 102 at any point and may merely represent logical values which conveniently describe the processing performed by the scheduler 102 between its input and output.

The scheduler 102 and/or processor 100 described herein may be embodied in hardware on an integrated circuit. The scheduler 102 and/or processor 100 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a scheduler 102 and/or processor 100 configured to perform any of the methods described herein, or to manufacture a scheduler 102 and/or processor 100 comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a scheduler 102 and/or processor 100 will now be described with respect to FIG. 6.

Figure 6:
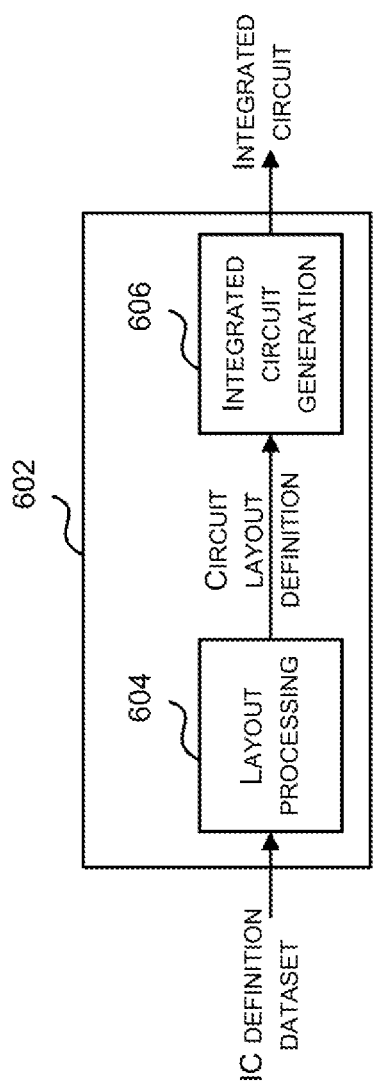
FIG. 6 shows an integrated circuit manufacturing system for generating an integrated circuit embodying a scheduler.

FIG. 6 shows an example of an integrated circuit (IC) manufacturing system 602 which comprises a layout processing system 604 and an integrated circuit generation system 606. The IC manufacturing system 602 is configured to receive an IC definition dataset (e.g. defining a scheduler 102 and/or processor 100 as described in any of the examples herein), process the IC definition dataset, and generate an IC according to the IC definition dataset (e.g. which embodies a scheduler 102 and/or processor 100 as described in any of the examples herein). The processing of the IC definition dataset configures the IC manufacturing system 602 to manufacture an integrated circuit embodying a scheduler 102 and/or processor 100 as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a scheduler 102 and/or processor 100 without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of scheduling tasks in a task queue within a processor, the task queue comprising tasks having task type identifiers and associated state data identifying any task specific dependencies, the method comprising:
   in response to receiving, at a task scheduling engine, an indication that a dependency for a task in the task queue has completed, updating the state data for the task that relates to the completed dependency to indicate that the dependency has completed and updating wakeup event state data of the processor to indicate a wakeup event for the task type identifier of the task;
   identifying one or more candidate task types based on the wakeup event state data indicating a wakeup event; and
   selecting a task for execution based on the identified one or more candidate task types.

2. The method according to claim 1, wherein updating state data for the task that relates to the completed dependency comprises clearing a state bit for the task that relates to the completed dependency.

3. The method according to claim 1, wherein updating wakeup event state data for the task type identifier of the task comprises setting a wakeup event state bit for a task type corresponding to the task type identifier of the task.

4. The method according to claim 1, wherein a task has a both a task type identifier and a data group identifier,
   wherein the wakeup event state data is updated for a combination of the task type corresponding to the task type identifier of the task and the data group corresponding to the data group identifier of the task,
   and wherein selecting a task for execution based on the identified one or more candidate task types comprises:
      selecting a task for execution based on the identified one or more candidate task types that has a task type identifier and data group identifier that correspond to wakeup event state data that has been updated.

5. The method according to claim 4, wherein a wakeup event state bit is set for the combination of the task type corresponding to the task type identifier of the task and the data group corresponding to the data group identifier of the task and selecting a task for execution based on the identified one or more candidate task types that has a task type identifier and data group identifier that correspond to wakeup event state data that has been updated comprises:
   selecting a task for execution based on the identified one or more candidate task types that has a task type identifier and data group identifier that correspond to a wakeup event state bit that has been set.

6. The method according to claim 4, further comprising:
   in response to determining that the selected task does not have all its dependencies met, clearing the wakeup event state data for the task type identifier and data group identifier of the identified task; and
   selecting a task for execution based on the identified one or more candidate task types that has a task type identifier and data group identifier that correspond to wakeup event state data that has been updated.

7. The method according to claim 1, further comprising:
   in response to receiving a task at the task scheduling engine, adding the task to the task queue and setting state data for the task to identify any dependencies for the task.

8. The method according to claim 1, further comprising:
   in response to receiving, at the task scheduling engine, an indication that a task has completed execution, removing the task from the task queue.

9. The method according to claim 1, further comprising:
   in response to receiving, at the task scheduling engine, an indication that a task has completed execution, determining if the task is a first phase task of a multi-phase task;
   in response to determining that the task is not a first phase task of a multi-phase task, removing the task from the task queue; and
   in response to determining that the task is a first phase task of a multi-phase task, scheduling a second phase task of the multi-phase task.

10. The method according to claim 9, wherein selecting a task for execution based on the identified one or more candidate task types further comprises prioritizing selection of a task that is a second phase task of a multi-phase task over tasks that are not second phase tasks.

11. A scheduler for a processor comprising:
- a task scheduling engine;
- a task queue comprising tasks having task type identifiers and associated state data identifying any task specific dependencies; and
- a data store arranged to store wakeup state data, and wherein the task scheduling engine comprises:
- a first hardware logic block arranged, in response to receiving an indication that a dependency for a task in the task queue has completed, to update the state data for the task that relates to the completed dependency to indicate that the dependency has completed by clearing the state data for the task and to update wakeup event state data of the processor to indicate a wakeup event for the task type identifier of the task;
- a second hardware logic block arranged to identify one or more candidate task types based on the wakeup event state data indicating a wakeup event and to select a task for execution based on the identified one or more candidate task types.

12. The scheduler according to claim 11, wherein the wakeup state data comprises a plurality of wakeup state bits,
- wherein the first hardware logic is arranged, in response to receiving an indication that a dependency for a task in the task queue has completed, to clear a state bit for the task that relates to the completed dependency and to update a wakeup event state bit for a task type corresponding to the task type identifier of the task,
- and wherein the second hardware logic block is arranged to identify one or more candidate task types based on the wakeup event state bits and to select a task for execution based on the identified one or more candidate task types.

13. The scheduler according to claim 12, wherein a task has a both a task type identifier and a data group identifier,
- wherein the first hardware logic block is arranged to set a wakeup event state bit for a combination of the task type corresponding to the task type identifier of the task and the data group corresponding to the data group identifier of the task,
- and wherein the second hardware logic block is arranged to select a task for execution based on the identified one or more candidate task types that has a task type identifier and data group identifier that correspond to a wakeup event state bit that has been updated.

14. The scheduler according to claim 13, wherein the second logic block is further arranged, in response to determining that the selected task does not have all its dependencies met, to clear the wakeup event state bit for the task type identifier and data group identifier of the identified task and to select a task for execution based on the identified one or more candidate task types that has a task type identifier and data group identifier that correspond to a wakeup event state bit that has been set.

15. The scheduler according to claim 11, wherein the task queue comprises state data associated with each task stored in the task queue and the scheduler further comprises:
- a third hardware logic block arranged, in response to receiving a task, to add the task to the task queue and set the state data for the task to identify any dependencies for the task.

16. The scheduler according to claim 15, wherein the state data comprises a plurality of state bits.

17. The scheduler according to claim 11, further comprising:
- a fourth hardware logic block arranged, in response to receiving an indication that a task has completed execution, to remove the task from the task queue.

18. The scheduler according to claim 11, further comprising:
- a fourth hardware logic block arranged, in response to receiving an indication that a task has completed execution, to determine if the task is a first phase task of a multi-phase task; and in response to determining that the task is not a first phase task of a multi-phase task, to remove the task from the task queue; and in response to determining that the task is a first phase task of a multi-phase task, to schedule a second phase task of the multi-phase task.

19. The scheduler according to claim 18, wherein the second hardware logic block is further arranged to prioritize selection of a task that is a second phase task of a multi-phase task over tasks that are not second phase tasks when identifying the oldest non-executing task of the selected task type.

20. An integrated circuit manufacturing system comprising:
- a non-transitory computer readable storage medium having stored thereon a computer readable description of an integrated circuit that describes a scheduler;
- a layout processing system configured to process the integrated circuit description so as to generate a circuit layout description of an integrated circuit embodying the scheduler; and
- an integrated circuit generation system configured to manufacture the scheduler according to the circuit layout description, wherein the scheduler comprises:
- a task scheduling engine;
- a task queue comprising tasks having task type identifiers and associated state data identifying any task specific dependencies; and
- a data store arranged to store wakeup state data, and wherein the task scheduling engine comprises:
- a first hardware logic block arranged, in response to receiving an indication that a dependency for a task in the task queue has completed, to update the state data for the task that relates to the completed dependency to indicate that the dependency has completed by clearing state data for the task and to update wakeup event state data of the processor to indicate a wakeup event for the task type identifier of the task;
- a second hardware logic block arranged to identify one or more candidate task types based on the wakeup event state data indicating a wakeup event and to select a task for execution based on the identified one or more candidate task types.

* * * * *